May 18, 1926.
C. KATZ
1,585,551
UMBRELLA CARRIER
Filed Oct. 10, 1925
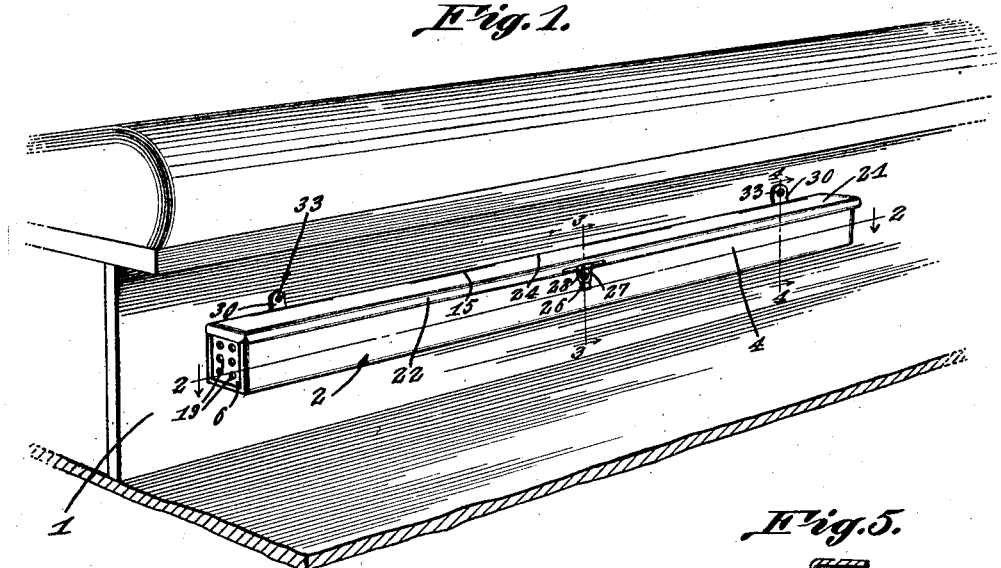
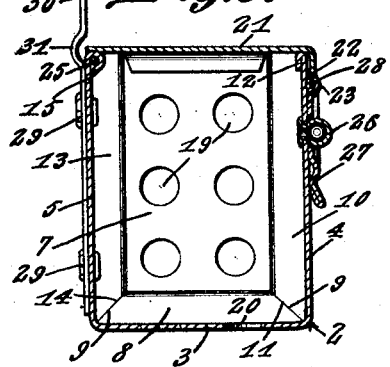
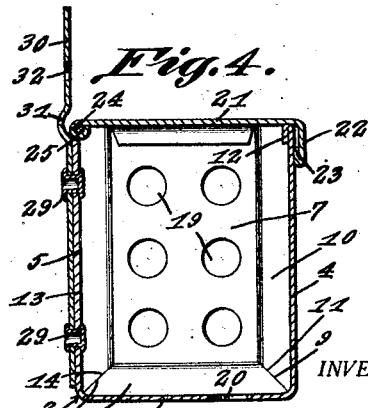
INVENTOR.
BY *Charles Katz,*
*Geo. P. Kimmel.* ATTORNEY.

Patented May 18, 1926.

1,585,551

UNITED STATES PATENT OFFICE.

CHARLES KATZ, OF BALTIMORE, MARYLAND.

UMBRELLA CARRIER.

Application filed October 10, 1925. Serial No. 61,787.

This invention relates to an umbrella carrier for use in connection with motor vehicles, and has for its object to provide, in a manner as hereinafter set forth, a carrier in the form of a receptacle, capable of being secured to an automobile body, preferably to the front riser of a seat, for the purpose of storing an umbrella when not in use, and further with the carrier so constructed that when secured in position it will not interfere with the occupants of the vehicle and can be readily reached to provide for the convenient removal of the umbrella when the latter is desired for use.

A further object of the invention is to provide, in a manner as hereinafter set forth, an umbrella carrier, having means for the circulation of air therethrough for the purpose of drying a damp umbrella when the latter is stored in the carrier.

A further object of the invention is to provide, in a manner as hereinafter set forth, a carrier for the purpose referred to, having means to permit of convenient access thereto and for securely maintaining the umbrella in position when stored therein.

Further objects of the invention are to provide, in a manner as hereinafter set forth, an umbrella carrier for motor vehicles, which is simple in its construction and arrangement, strong, durable, compact, not impairing the appearance of the vehicle when the carrier is secured thereto, thoroughly efficient in its use, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary view, in perspective, of a seat of a motor vehicle, showing the adaptation with the front riser thereof of an umbrella carrier, in accordance with this invention.

Figure 2 is a section on line 2—2, Figure 1.

Figure 3 is a section on line 3—3, Figure 1.

Figure 4 is a section on line 4—4, Figure 1.

Figure 5 is a fragmentary view in section and upon an enlarged scale illustrating the form of joint between an end wall and the body portion.

Referring to the drawings in detail, 1 denotes the front riser of a seat of a motor vehicle, and 2 generally indicates the carrier which is attached to the riser 1, in a manner to be presently referred to.

The carrier 2 is of a height, width and length to provide for snugly storing therein a single umbrella and further is of less length than the length of the riser 1. Although the carrier 2 is illustrated as connected to the riser 1, it is to be understood that it can be secured to any other desirable portion of the body of the vehicle, but by securing it to the riser 1 it does not interfere in any manner with an occupant of the vehicle.

The carrier 2 comprises an oblong body portion of appropriate depth consisting of a bottom 3, a front wall 4, a rear wall 5, and a pair of end walls 6, 7. The bottom 3, front wall 4 and rear wall 5 are formed from a single sheet of metallic material of the desired gage. The bottom 3, at each end, is formed with an upwardly extending flange 8 having beveled ends 9. The front wall 4, at each end, is formed with an inwardly extending flange 10 having a bevelled lower edge 11, which abuts against one of the bevelled ends 9 of the flange 8. The upper end of each of the flanges 10 is squared. The top of the front wall 4 is bent upon itself as at 12 for reinforcing purposes and to provide a wide top edge therefor and the bent portion 12 abuts against the inner faces of the flanges 10 at the upper ends thereof. The rear wall 5, at each end, is formed with an inwardly extending flange 13 having its lower edge bevelled, as at 14, and which abuts against the other end 9 of the flange 8. The upper edge of the flanges 13 is squared. The top of the wall 5 is formed with a series of spaced barrels 15.

Each of the flanges 8, 10 and 13 is inset, as at 16, Figure 5 and bent upon itself as at 17, Figure 5. Each of the end walls, at each side thereof and at its bottom, is bent upon itself as indicated at 18 in Figure 5 and extended between the inset portion 16 and bent portion 17 of a flange. After an end wall is arranged in interengaging position with respect to the flanges of the body portion at one end thereof, the interengaging portions are tightly pressed together and which secures the end wall in position at one end of the body portion.

Each end wall is provided with a series of openings 19 and the bottom 3 is formed with a series of openings 20, and the said openings provide for the circulation of air through the body portion for the purpose of drying a damp umbrella when the latter is stored in the body portion. The openings 20 provide for the discharge of water from the body portion.

The body portion of the carrier is of the open top form and is closed through the medium of a hinged lid or cover 21 formed at its ends and at its front with a depending rim 22, bent upon itself at the lower end, as at 23, for the purpose of stiffening the same, and also as a means to frictionally engage the outer faces of the front and end walls of the body portion. The rear side of the lid 21 is formed with a series of spaced barrels 24, which are alternately disposed with respect to the barrels 15, as well as aligning therewith, and extending through the aligning barrels is a pintle 25 to set up in connection with the barrels a hinge between the lid 21 and the rear wall 5 of the body portion.

The lid 21 is detachably secured in closed position, and any suitable means can be employed for such purpose and as shown the front wall 4 has secured therewith a spherical member 26 positioned exteriorly of the outer face of said wall and adapted to be engaged by an apertured latch member 27, which is pivotally secured, as at 28, to the front of the rim 22, centrally thereof.

Secured to the rear wall 5, by the hold-fast devices 29, is a plurality of vertically extending suspension members 30, which extend above the lid or cover 21 and each of which is provided intermediate its ends with a rearwardly extended offset portion 31, of semi-circular contour to provide a clearance when the lid or cover 21 is shifted to open position. Each of the members 30, above the offset portion 31, is provided with an opening 32 for the passage of a hold-fast device 33, to secure the carrier to the riser 1 or to any other desirable point of the body portion of the vehicle.

By reference to Figure 2, an umbrella 34, illustrated in dotted lines, is shown stored within the carrier.

It is thought the many advantages of an umbrella carrier, in accordance with this invention, can be readily understood, particularly in view of the fact that it provides means for drying a damp umbrella when stored therein, and further because it does not in any manner impair the appearance of the motor vehicle when secured thereto, and although the preferred embodiment of the invention is as illustrated and described, yet changes in the details of construction can be had which will fall within the scope of the invention as claimed.

What I claim is:

1. An umbrella carrier for motor vehicles comprising a receptacle formed of an open top body portion of oblong contour and a hinged lid or cover therefor, a plurality of strap like suspension members secured to the rear of the body portion, extending upwardly therefrom and each provided with a rearwardly directed offset portion positioned partially above and partially below the top edge of the body portion, to form a clearance for the lid or cover when the latter is swung to open position on its hinged connection, and said body portion provided with end openings for the circulation of air therethrough and further with bottom openings for the discharge of water therefrom when a wet umbrella is stored in the body portion.

2. An umbrella carrier comprising an open top oblong body portion consisting of a perforated bottom for the discharge of water therefrom, front and rear walls and a pair of fixed end walls, each of said end walls consisting of a perforated plate for the circulation of air through the receptacle when the latter is closed, each of said plates having the marginal portions of the sides and bottom thereof inturned, said bottom, front and rear walls having their ends provided with angularly disposed overlapping flanges interengaging with said inturned portions of said plates for fixedly securing these latter in a position to provide the end walls, and a closure for said open top hinged to the rear wall of said body portion.

In testimony whereof, I affix my signature hereto.

CHARLES KATZ.